United States Patent [19]

Sakamoto et al.

[11] Patent Number: 4,672,181
[45] Date of Patent: Jun. 9, 1987

[54] HEATING APPARATUS HAVING A WEIGHT DETECTOR

[75] Inventors: Kazuho Sakamoto, Kyoto; Makoto Mihara, Osaka, both of Japan

[73] Assignee: Matsushita Electric Industrial, Co., Ltd., Japan

[21] Appl. No.: 759,275

[22] Filed: Jul. 26, 1985

[30] Foreign Application Priority Data

Jul. 30, 1984 [JP] Japan .................. 59-159628
Jul. 30, 1984 [JP] Japan .................. 59-159629
Jul. 30, 1984 [JP] Japan .................. 59-159630

[51] Int. Cl.⁴ .............................................. H05B 6/68
[52] U.S. Cl. ............................. 219/518; 219/10.55 B; 219/10.55 R; 99/325; 99/DIG. 14; 177/245
[58] Field of Search ............... 219/10.55 B, 10.55 R, 219/10.55 E, 10.55 D, 10.55 C, 518; 99/325, DIG. 14; 177/132, 143, 144, 245

[56] References Cited

U.S. PATENT DOCUMENTS

| | | | |
|---|---|---|---|
| 3,725,656 | 4/1973 | Fukuma | 177/3 X |
| 4,190,756 | 2/1980 | Foerstner | 219/10.55 B |
| 4,232,210 | 11/1980 | Oida et al. | 219/10.55 B X |
| 4,255,639 | 3/1981 | Kawabata et al. | 219/10.55 B |
| 4,390,768 | 6/1983 | Teich et al. | 219/10.55 B |
| 4,413,168 | 11/1983 | Teich | 219/10.55 B |
| 4,539,453 | 9/1985 | Miyazaki et al. | 219/10.55 C |

FOREIGN PATENT DOCUMENTS

| | | |
|---|---|---|
| 0078325 | 5/1983 | European Pat. Off. . |
| 148124 | 7/1985 | European Pat. Off. ............ 177/245 |
| 3236290 | 4/1984 | Fed. Rep. of Germany . |
| 58-160742 | 9/1983 | Japan . |

*Primary Examiner*—Philip H. Leung
*Attorney, Agent, or Firm*—Lowe, Price, LeBlanc, Becker & Shur

[57] ABSTRACT

A heating apparatus comprises a housing having a chamber and a door for closing the chamber, and a power supply source to supply heating energy to the chamber. A door-close sensor is provided for detecting when the door is closed. A foodstuff is placed on a table which is vertically movably mounted in the chamber on a resilient support so that the table may oscillate at a frequency determined by the weight of the foodstuff. The housing may be constructed to transmit an impact to the table at the instant the door is closed, or alternatively, means are provided for causing the table to oscillate at the frequency in response to the door being closed. The oscillation of the table is converted to an electrical signal and analyzed to determine the weight of the foodstuff. The power supply source is controlled in accordance with the determined weight.

10 Claims, 6 Drawing Figures

HEATING APPARATUS HAVING A WEIGHT DETECTOR

BACKGROUND OF THE INVENTION

The present invention relates to a heating apparatus of the type wherein the weight of a foodstuff to be heated is measured to control the apparatus.

It is known to automatically control a heating apparatus such as microwave ovens in accordance with the weight of a foodstuff being cooked as shown and described in Japanese Patent Publication No. 58-160742. The weight detector disclosed in this publication is of the type wherein the placement of a foodstuff on a table causes it to vibrate at a frequency determined by the weight of the foodstuff and this frequency is detected as a measure of the weight of the foodstuff. Since the vibration of the table diminishes to an insignificant level with time, it is necessary to effect the weight determination at the instant the foodstuff is placed on the table. However, undesirable oscillations may occur during the initial period and would result in an error in the weight determined. Furthermore, foodstuffs may be placed in succession before the door is closed. This would need to continuously monitor changes in the weight of the foodstuff before the door is closed.

SUMMARY OF THE INVENTION

Therefore, an object of the present invention is to eliminate the above-mentioned problem by initiating the determination of the weight of a foodstuff after the door of a heating apparatus is closed.

According to the invention, the heating apparatus comprises a housing having a chamber in which a foodstuff is to be placed and a door for closing the chamber, and a power supply source to supply heating energy to the chamber. A door-close sensor is provided to detect when the door is closed. In response to the detection of the closure of the door by the sensor the weight of the foodstuff is determined to control the power supply source in accordance with the determined weight.

Preferably, a delayed action is performed in response to the detection of the door closure before the determination of the weight to avoid undesirable oscillations.

In a specific aspect of the invention, the heating apparatus includes a table vertically movably mounted in the chamber for supporting a foodstuff thereon, means for resiliently supporting the table so that same oscillates at a frequency determined by the weight of the foodstuff. The housing is constructed to transmit an impact generated upon the closure of the door to the table to cause same to oscillate at the frequency. Alternatively, means are provided for positively causing the table to oscillate in response to the door being closed. The oscillation of the table is converted to a corresponding electrical signal and analyzed to determine the weight of the foodstuff.

BRIEF DESCRIPTION OF THE DRAWINGS

The present invention will be described in further detail with reference to the accompanying drawings, in which.

DETAILED DESCRIPTION

Figure 1:
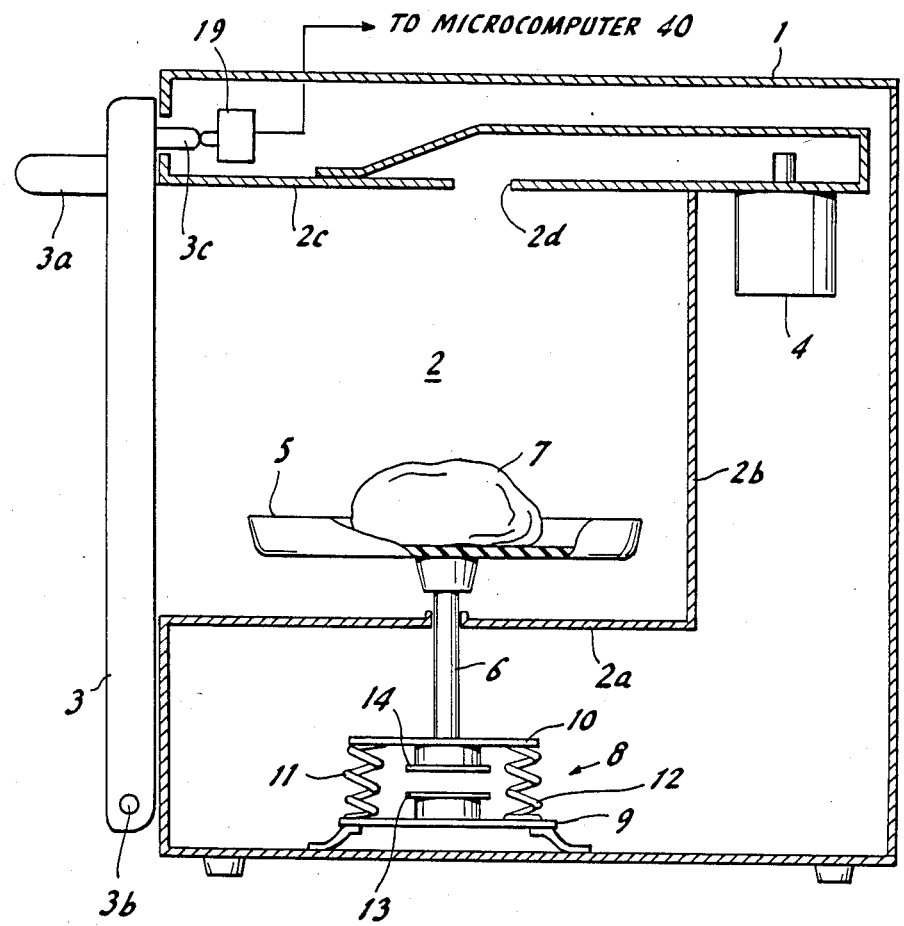
FIG. 1 is a cross-sectional view of a microwave oven according to a first embodiment of the present invention.
Figure 2:
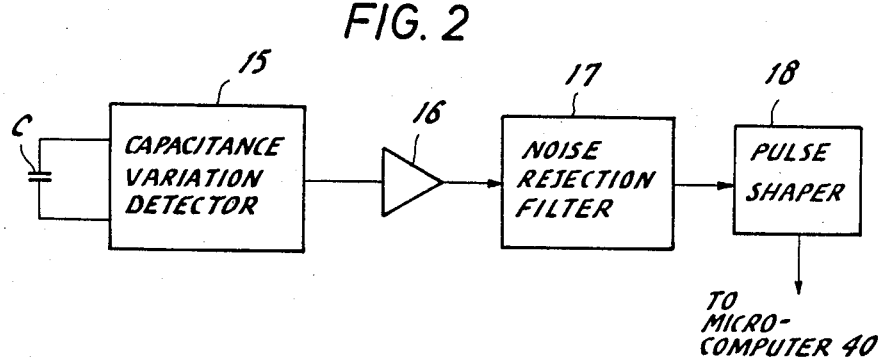
FIG. 2 is a schematic diagram of a circuit associated with the weight detector of FIG. 1.

Referring now to FIG. 1, there is shown a microwave oven according to a first embodiment of the invention. The microwave oven includes a housing 1 having a heating chamber 2 bounded by a bottom wall 2a, side walls 2b and a top wall 2c. The heating chamber 2 is closed by a door 3 having a handle 3a, the door being hinged on horizontal pivot 3b. The top wall 2c is formed with an opening 2d through which microwave energy, generated by a magnetron 4, is radiated into the chamber 2. A table 5, on which a foodstuff 7 is to be placed, is mounted on a shaft 6 which extends through the bottom wall 2a of the chamber and secured to a weight detector 8. The weight detector 8 comprises a base 9 and an upper support 10 secured to the lower end of shaft 6, the upper support being resiliently connected by springs 11 and 12 to the base 9. Condenser plates 13 and 14 are secured to the lower and upper members 9 and 10, respectively, in opposition to each other to constitute a variable capacitance C which varies as a function of the weight of the foodstuff 7. With the foodstuff 7 being placed in position, the closure of door 3 will cause a vibration to occur in the housing 1 and transmitted to the table 5 causing it to vibrate in vertical directions at a frequency determined by the weight of the foodstuff 7. The capacitance C is presented to a capacitance variation detector 15 of any known type to detect the frequency of the vibration. The output of the detector 15 is amplified at 16 and fed through a noise rejection filter 17 to a pulse shaper 18. The output of the pulse shaper 18, which is a train of pulses occurring at the frequency inversely proportional to the weight of the foodstuff, is applied to a microcomputer.

According to the present invention, the microwave oven further includes a door-close sensing switch 19 arranged to engage with a projection 3c provided on the upper end of door 3 in order to generate a signal when the door 3 is closed. The vibration signal is fed to the microcomputer where its frequency is analyzed to detect the weight of the foodstuff to control the heating operation. To cause the microcomputer to initiate the weight measurement after the door has been closed, the door close signal from switch 19 is applied to the microcomputer.

Figure 3:
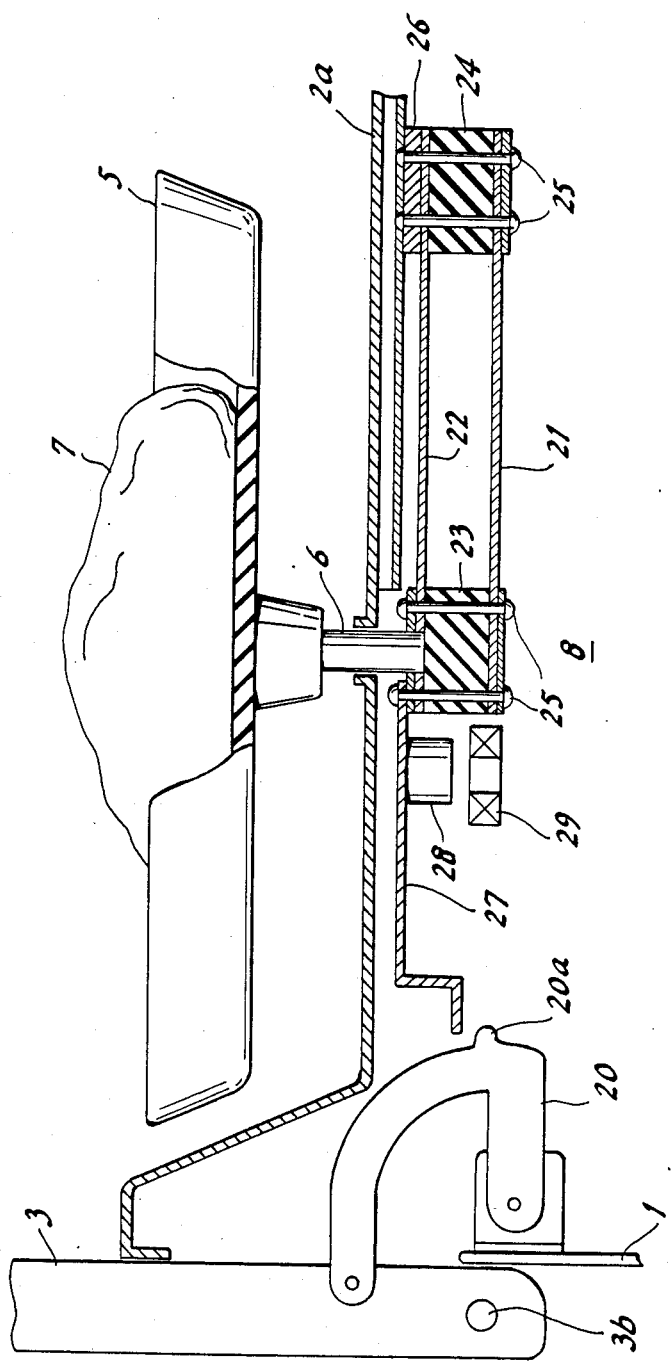
FIG. 3 is a cross-sectional view of a microwave oven according to a second embodiment of the invention.

FIG. 3 is an illustration of a modified form of the present invention. In this embodiment, the vibration of table 5 is positively generated by means of a triggering pawl 20 which is pivotally connected to door 3 and housing 1 for rotation therewith. The weight detector 8 comprises a pair of parallel lower spring members 21 and a pair of parallel upper spring members 22. The lower and upper pairs are connected at opposite ends by cross-members 23 and 24 by screws 25 to constitute a Roberval mechanism. The right end of the Roberval mechanism is connected to the bottom wall 2a of heating chamber 2 by a spacer 26 and the left end of it is secured to the shaft 6. The mechanism 8 has an extension 27 to engage with a projection 20a of the pawl member 20. On the underside of extension 27 is attached a permanent magnet 28 in proximity to a coil 29 mounted on a stationary support, not shown. The Roberval mechanism 8 allows its spring members 21, 22 to maintain their parallel relationship under the weight of the foodstuff 7 so that table 5 moves precisely in vertical directions despite the varying weight of the foodstuff. When the door 3 is closed with a foodstuff being placed on table 5, the projection 20a strikes the free end of the weight detector 8 to thereby cause it to vibrate at a frequency proportional to the weight of the foodstuff 7 and induce a corresponding alternating voltage in the coil 29.

Figure 4:
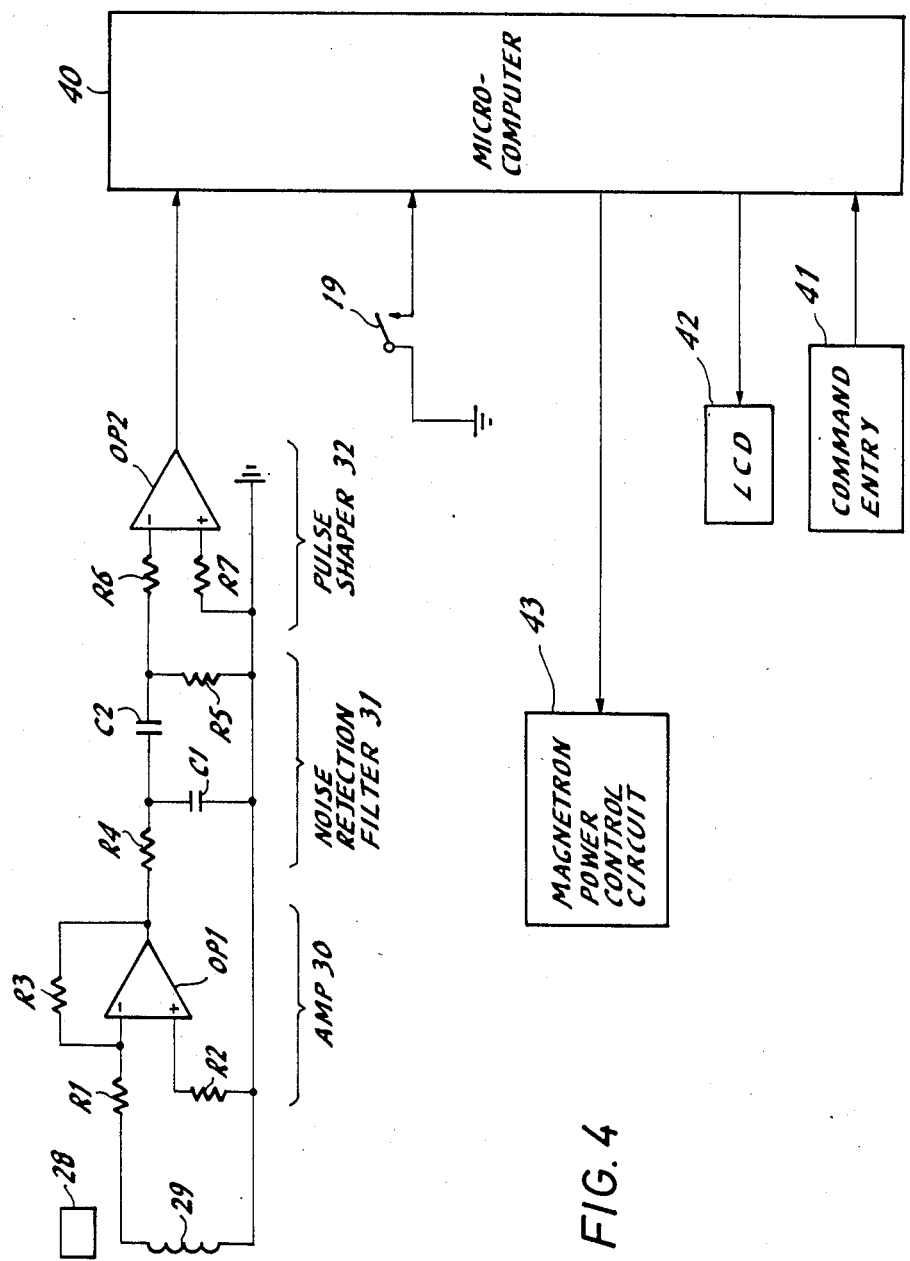
FIG. 4 is a schematic diagram of a heating control circuit including a microcomputer.

As illustrated in FIG. 4, the coil 29 is connected to an amplifier 30 comprising resistors R1, R2, R3 and an operational amplifier OP1 which amplifies the voltage induced in coil 29 by the ratio of registers R3 to R1 and supplies it to a noise rejection filter 31. Filter 31 comprises registers R4, R5 and capacitors C1, C2 to reject noise which might be generated by the magnetron 4 and other undesirable oscillations. The noise-eliminated oscillation voltage is presented to a pulse shaper 32 comprising an operational amplifier OP2 and resistors R6, R7 to generate rectangular pulses in response to the voltage oscillations.

As shown in FIG. 4, the microcomputer 40 receives the output of pulse shaper 18 or 32 and the output of door-close sensor 19. Microcomputer 40 is further supplied with a command signal supplied from a command entry means, or keyboard 41 to provide visual display on a liquid-crystal display panel 42. Microcomputer 40 is programmed to control the magnetron 4 through a power control circuit 43 which performs on-off control on the power supplied to the magnetron 4.

Figure 5:
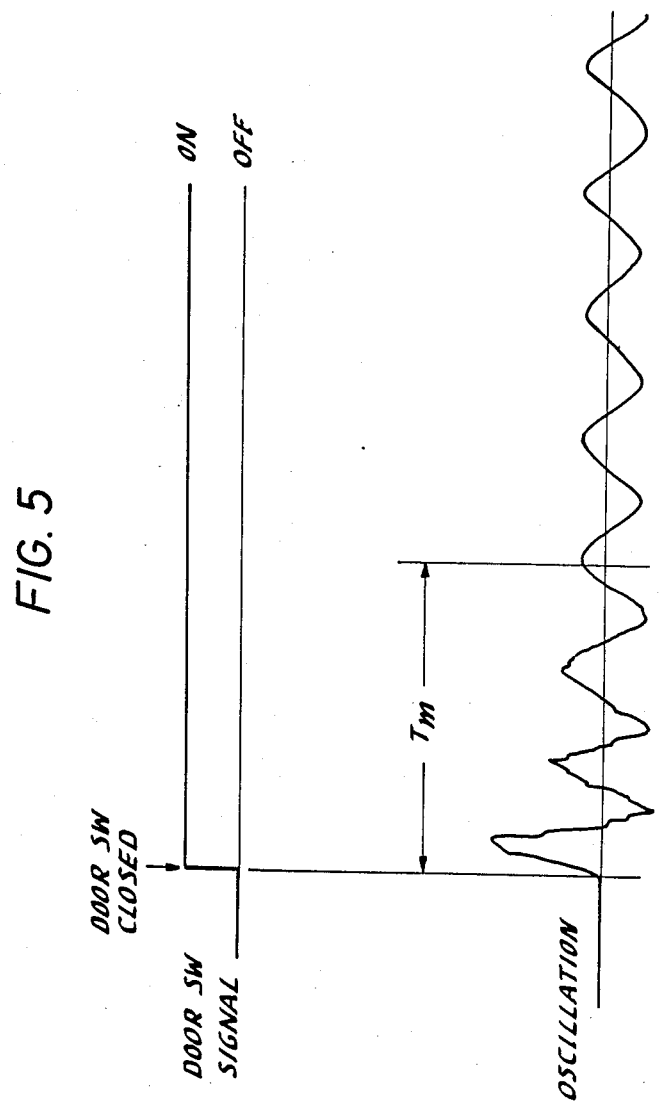
FIG. 5 is a waveform diagram illustrating the oscillation of a table in relation to a door-close signal.

Since the initial oscillation immediately after the closure of door 3 is unstable as shown in FIG. 5, it is desirable that the microcomputer 40 be programmed to initiate frequency analysis after the unstability oscillation has subdued. A delay time Tm is thus introduced before the frequency analysis is initiated.

Figure 6:
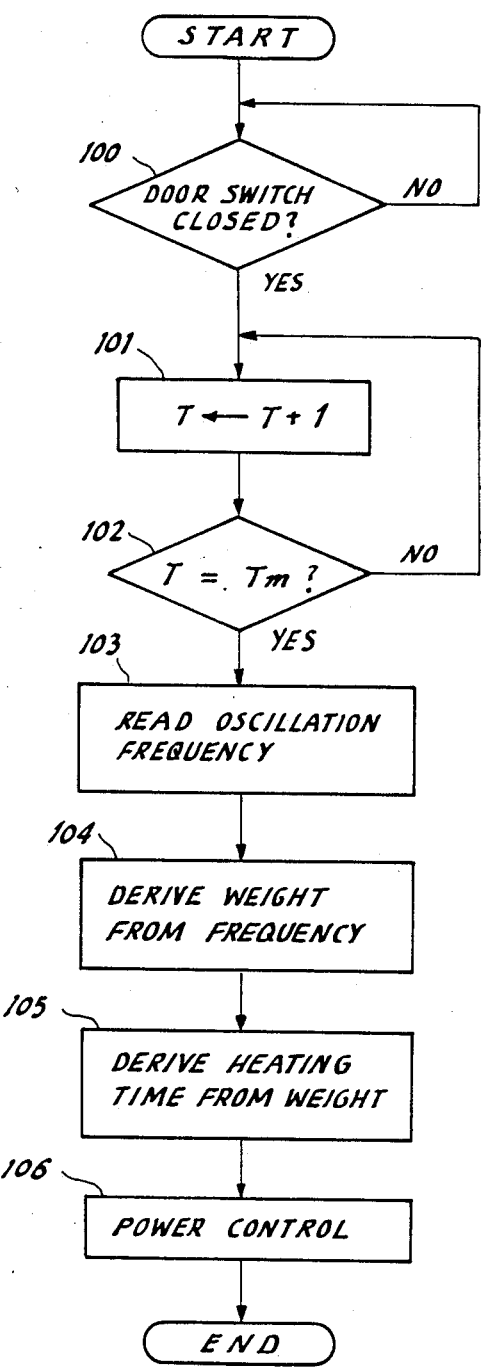
FIG. 6 is a flowchart of the operation of the microcomputer.

FIG. 6 illustrates a sequence of programmed heating control instructions stored in a memory of the microcomputer 40. When the closure of door switch 19 is detected in block 100, control advances to block 101 to increment a timer count T by 1 and determines if count T reaches the preset delay time period Tm (block 102). Blocks 101 and 102 will thus be repeated until the period Tm is reached whereupon control proceeds to block 103 to read the output of pulse shaper 18 or 32 to detect a corresponding frequency from a memory in which is stored the relationship between the frequency and the weight. Block 104 is executed to derive the weight of the foodstuff 7 from the frequency so determined in a manner known in the art. Control exits to block 105 to determine a heating time and a heating pattern from the weight so determined. Power control is then effected (block 106) in accordance with the data determined in block 105.

What is claimed is:

1. A heating apparatus comprising:
    a housing having a chamber in which a foodstuff is to be placed and a door for closing said chamber;
    a power supply source to supply energy to said chamber for heating the foodstuff;
    first means for detecting when said door is closed; and
    second means connected to be responsive to said first means for allowing said power supply source to supply energy to said chamber only when said door is closed, for determining the weight of the foodstuff only in response to detection by said first means of the closure of said door and for controlling said power supply to supply energy to heat the foodstuff in accordance with the determined weight.

2. A heating apparatus as claimed in claim 1, wherein said second means introduces a delay time in response to the detection of the door closure and initiates the determination of said weight after the delay time has elapsed.

3. A heating apparatus as claimed in claim 1, wherein said second means comprises:
    a table vertically movably mounted in said chamber for supporting said foodstuff thereon;
    means for resiliently supporting said table so that the latter oscillates at a frequency determined by the weight of said foodstuff when the foodstuff is placed on said table;
    means for converting the oscillation of said table to a corresponding electical signal; and
    means for analyzing said signal to determine the weight of said foodstuff.

4. A heating apparatus as claimed in claim 3, wherein said housing is constructed to transmit to said table an impact generated in response to said door being closed to cause the table to oscillate at said frequency.

5. A heating apparatus as claimed in claim 3, further comprising means connected to said door for positively causing said table to oscillate in response to said door being closed.

6. A heating apparatus as claimed in claim 3, further comprising means connected to said door for positively causing said table to oscillate when the door is closed, wherein said second means introduces a delay time in response to the detection of the door closure and initiates the determination of said weight after said delay time has elapsed.

7. A heating apparatus comprising:
    a housing having a chamber and a door for closing said chamber;
    a power supply means for supplying heating energy to said chamber;
    first means for detecting when said door is closed;
    a table vertically movably mounted in said chamber for supporting a foodstuff thereon;
    support means resiliently supporting said table so that the table oscillates at a frequency determined by the weight of the foodstuff;
    said housing comprising means for transmitting to said table an impact generated upon the closure of said door to cause the table to oscillate at said frequency;
    means for converting said oscillation to a corresponding electrical signal; and
    control means connected to be responsive to detection by said first means of the closure of said door for analyzing said signal to determine the weight of the foodstuff and for controlling said power supply means to heat the foodstuff in accordance with the determined weight.

8. A heating apparatus as claimed in claim 7, wherein said control means includes delay means for determining a predetermined delay time in response to the detection of the door closure by said detection means and for initiating the determination of the weight of the foodstuff after the predetermined delay time has elapsed.

9. A heating apparatus comprising:

a housing having a chamber and a door for closing said chamber;

a power supply means for supplying heating energy to said chamber;

first means for detecting when said door is closed;

a table vertically movably mounted in said chamber for supporting a foodstuff thereon;

support means resiliently supporting said table so that the table oscillates at a frequency determined by the weight of the foodstuff;

means for causing said table to oscillate at said frequency in response to said door being closed;

means for converting said oscillation to a corresponding electrical signal; and control means connected to be responsive to detection by said first means of the closure of said door for analyzing said signal to determine the weight of the foodstuff and for controlling said power supply means to heat the foodstuff in accordance with the determined weight.

10. A heating apparatus as claimed in claim 9, wherein said control means includes delay means for determining a predetermined delay time in response to the detection of the door closure by said detection means and for initiating the determination of the weight of the foodstuff after the predetermined delay time has elapsed.

* * * * *